No. 764,650. PATENTED JULY 12, 1904.
E. F. W. WIEDA.
KNEADING AND MIXING MACHINE.
APPLICATION FILED FEB. 19, 1903.
NO MODEL. 2 SHEETS—SHEET 1.

WITNESSES:

INVENTOR,
Ernst F. W. Wieda,
BY
Gartner & Steward,
ATTORNEYS.

No. 764,650. PATENTED JULY 12, 1904.
E. F. W. WIEDA.
KNEADING AND MIXING MACHINE.
APPLICATION FILED FEB. 19, 1903.
NO MODEL. 2 SHEETS—SHEET 2.
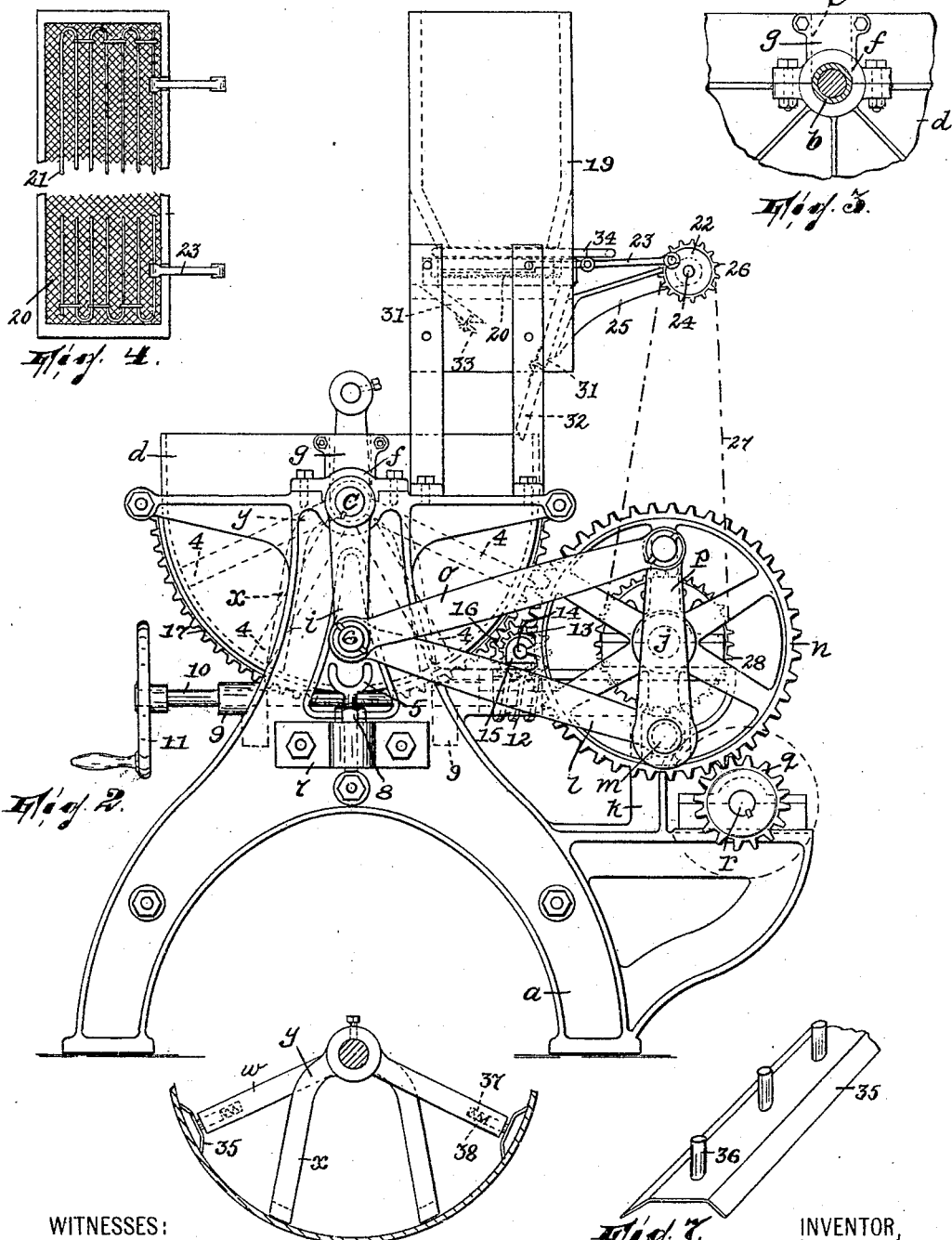

No. 764,650.

Patented July 12, 1904.

UNITED STATES PATENT OFFICE.

ERNST F. W. WIEDA, OF PATERSON, NEW JERSEY.

KNEADING AND MIXING MACHINE.

SPECIFICATION forming part of Letters Patent No. 764,650, dated July 12, 1904.

Application filed February 19, 1903. Serial No. 144,033. (No model.)

*To all whom it may concern:*

Be it known that I, ERNST F. W. WIEDA, a citizen of the United States, residing in Paterson, in the county of Passaic and State of New Jersey, have invented certain new and useful Improvements in Kneading and Mixing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention, which involves certain improvements on an apparatus set forth in my United States application, Serial No. 105,602, filed May 2, 1902, relates to machines for mixing the materials for making candy, dough, and other similar substances.

The improvements constituting the present invention will be found fully illustrated in the accompanying drawings, wherein—

Figure 1:
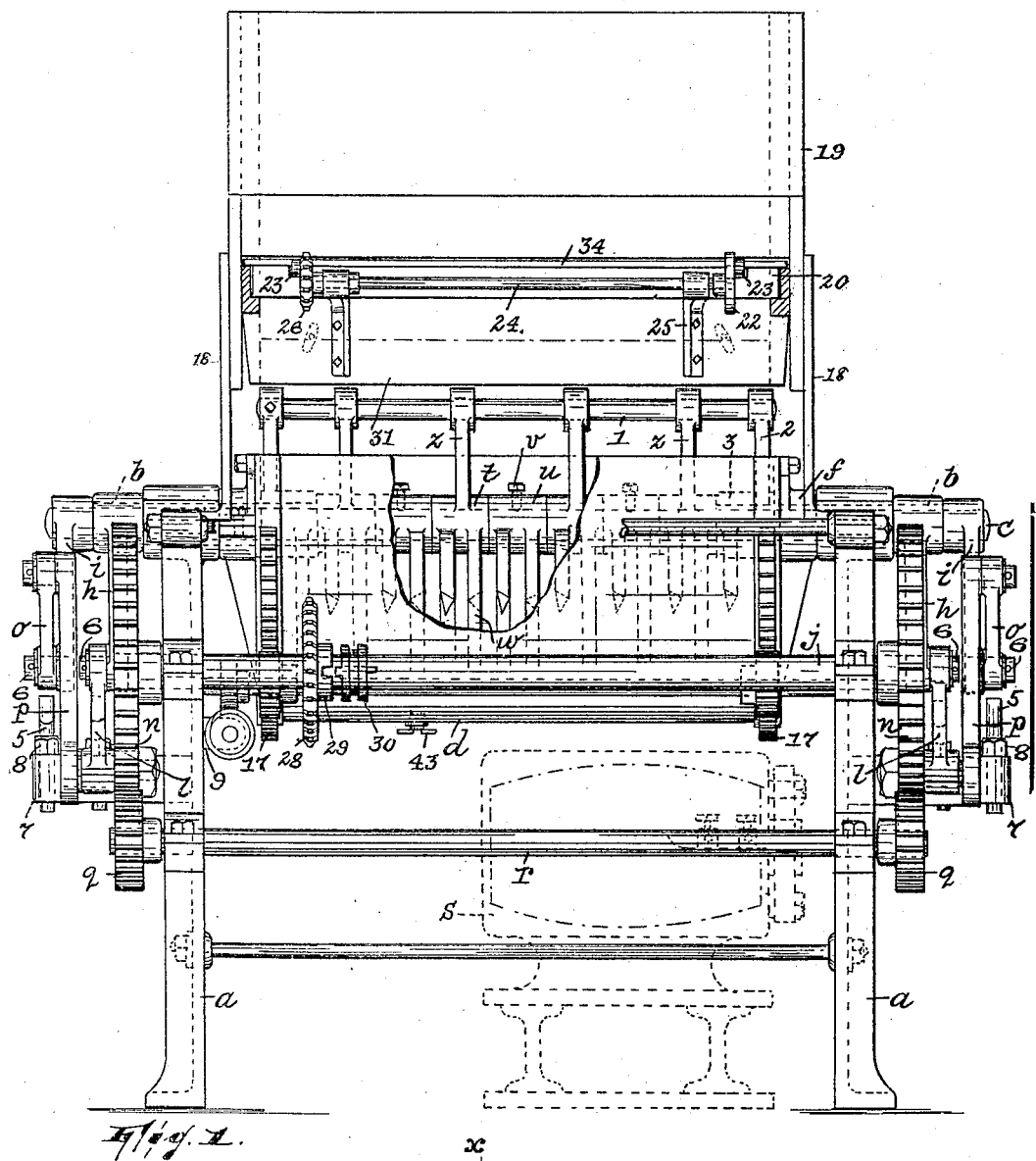
Figure 5:
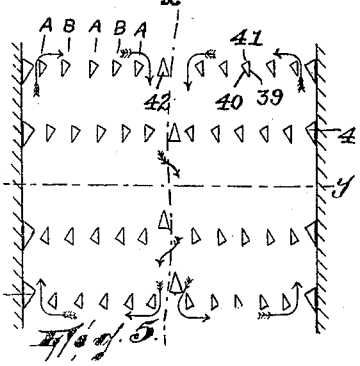

Figure 1 is a front view of the machine; Fig. 2, a side view; Fig. 3, a detail illustrating how the mixing vessel is sustained; Fig. 4, a detail illustrating a portion of a sifting mechanism; Fig. 5, a diagrammatic view illustrating the action of the mixing fingers or agitators, and Figs. 6 and 7 details showing a modification.

In suitably-braced standards $a$ are journaled sleeves $b$, through which extends and in which has bearings a shaft $c$.

$d$ is the vessel in which the mixing is effected, it being substantially semicircular in cross-section, as seen in Fig. 2. The end walls of this vessel are formed with vertical slots $e$, which receive the sleeves $b$, and the vessel is supported on said sleeves so as to be capable of turning thereon by bearing-blocks $f$, which are bolted to the vessel and which, moreover, are provided with webs $g$, covering said slots.

On the outer end of each sleeve $b$ is secured a crank $h$, and on each end of the shaft is secured another crank, $i$. These cranks are vibrated, so as to oscillate the sleeves relatively to the shaft in opposite directions from a shaft $j$, journaled in brackets $k$, forming parts of the standards $a$, through the medium of pitmen $l$, which connect the ends of cranks $h$ with crank-pins $m$ on gear-wheels $n$, carried by shaft $j$, and by pitmen $o$, which connect cranks $i$ with the ends of cranks $p$, secured fast on the ends of the crank-pins $m$ and extending diametrically across gears $n$. Gears $n$ are driven by pinions $q$, with which they intermesh and which are fast on a drive-shaft $r$, which may be the axis of an electric motor or other source of power, (indicated in dotted lines at $s$ in Fig. 1.)

On that part of shaft $c$ which is within the vessel $d$ are arranged series of collars $t$ $u$. The series $u$ are secured fast to the shaft by set-screws $v$, while the series $t$ are free to rotate on the shaft, the collars of one series alternating with those of the other. Each collar in the series is provided with a pair of straight radial agitators $w$ and with another pair of agitators, $x$, which until they approach their respective collar extend almost parallel with each other, whereupon they curve inwardly at $y$, as seen in dotted outline in Fig. 2. One of the agitators $w$ and one of the agitators $x$ in each case are arranged in the same plane of rotation around shaft $c$. The series of collars $t$ are provided with upwardly-extending arms $z$, connected by a rod 1. The ends of this rod are received by cranks 2, extending upwardly from collars 3, secured fast on sleeves $b$. In view of the foregoing it will be seen that when shaft $j$ is rotated the train of mechanism connecting it with the two series of collars $t$ and $u$ will cause the latter and the agitators they carry to oscillate in opposite directions, collars $u$ oscillating with shaft $c$ and collars $t$ oscillating with sleeves $b$.

Collars 3 carry radial scrapers 4, designed to clean the flat end walls of the vessel. If desired, these collars may carry either the one or the other or both of the pairs of agitators $w$ $x$.

In mixing dough and substances of that nature it is usually necessary to operate both sets of agitators; but in mixing certain candy materials it is found necessary to oscillate only one set of agitators. In order to throw the other set of agitators out of action in the latter instance, they may be secured stationary or idle after disconnecting their corresponding pitmen o (or l) by forks 5, adapted to receive the crank-pins 6 on cranks h and i and for this purpose being adjustably mounted in blocks 7 by means of nuts 8.

In order to facilitate access to the vessel d, especially when removing its contents, means is provided for tilting it about the sleeves b as an axis. In bearings 9 is therefore journaled a shaft 10, carrying an operating-wheel 11 and having a worm 12, which meshes with a worm-wheel 13 on a shaft 14, journaled in bearings 15 and carrying pinions 16, which mesh with arc-shaped racks 17, secured to the end portions of vessel d. By manipulating hand-wheel 11 the above-described gearing connecting shaft 10 with the vessel will cause the vessel to be tilted to any position desired.

On supports 18, projecting upwardly from standards a, is sustained a rectangular hopper 19, whose bottom is formed as a sieve 20 and on which rests a wire frame 21, designed to be agitated over the surface of the sieve, so as to work the material to be sifted through the sieve. To this end frame 21 is connected to eccentric points on wheels 22 by pitmen 23, said wheels being secured on a shaft 24, which is journaled in brackets 25 and one of them being formed with teeth 26 and connected by a sprocket-chain 27 with a sprocket-wheel 28, freely revoluble on shaft j. Sprocket-wheel 28 is disconnectively connected with shaft j by means of a clutch consisting of clutch member 29, formed on the sprocket-wheel, and clutch member 30, splined on the shaft.

31 represents deflectors arranged below the sieve and inclined so as to properly direct the sifted material into the vessel d. One of them comprises hinged members, one of which, 32, may be turned up and secured to the other deflector, 31, by a catch 33, so as to close the passage otherwise formed.

34 is a slide disposed above the sieve and forming a false or movable bottom for the hopper.

The materials to be mixed can by the above-described mechanism be automatically sifted, it being only necessary after placing them in the hopper 19 to shift clutch member 30, so as to throw the sprocket-wheel 29 into rotative connection with the shaft j.

In mixing certain substances, such as some candy substances, the material is likely to adhere to the curved wall of the vessel. To the ends of one of the sets of agitators w are therefore connected scrapers 35, formed with plugs 36, which work in sockets 37 in the ends of the agitators, said sockets being fitted with springs 38, which press the scrapers against said curved wall of the vessel.

The agitators or fingers w x may be formed so that when assembled they will be arranged as in Fig. 5. To this end each has the cross-sectional triangular shape shown in said figure, the point of the triangle projecting inwardly. One face, 39, of each finger is parallel with the finger's plane of movement, another, 40, is acutely oblique, and the third, 41, less acutely oblique to said plane. The vertical rows of agitators A in said figure are on the collars t, while those marked B are on collars u. Moreover, the entire complement of fingers may be regarded as being divided centrally, as by dotted line x in said figure, into two sections, all the fingers in each section above the horizontal line y having their faces 39 disposed outwardly relatively to line x, while those below line y have their faces 39 disposed inwardly. The two series of agitators or fingers are separated by a set of fingers 42, which may be all mounted on one collar t or u and having the cross-sectional shape of an isosceles triangle. Practice has demonstrated that by forming and arranging the fingers as above described, and particularly by dividing them into two sections in which those in one section are not only reversed with reference to those in the other, but are in themselves divided into two relatively reversed groups, a more perfect mixing is made possible where the machine is of large size, so that the vessel d has in consequence considerable length. The "goods" takes the courses indicated by the arrows in Fig. 5, the angles formed by the sides 39 and 40 of the fingers making knife-edges, facilitating the fingers cutting their way through the goods in their forward movement, while the rear faces 41, which are reversely oblique, tend to force the goods not only back on the return strokes, but laterally in opposite directions. This action occurs with reference to either of the series of fingers. The action is augmented by the scrapers 4, which being of the same sectional shape as the fingers act not only to keep the goods clear of the vessel's end walls in their forward strokes, but in their return strokes to further induce the goods to follow the direction of the arrows.

43 is a screw-plug for an outlet formed in the bottom of the vessel, whereby when the vessel is washed out the water used therefor may be drained off.

Having thus fully described my invention, what I claim as new, and desire to secure by Letters Patent, is—

1. The combination, with a frame, of a vessel for receiving the material to be operated upon, a shaft, a set of agitators fixed on said shaft, another set of agitators alternating with said first-named agitators and arranged to turn on said shaft, means for rigidly connecting said last-named set of agitators, and means for causing said agitators to move in reverse directions about said shaft as a center, substantially as described.

2. The combination, with a frame, of a vessel for receiving the material to be operated upon, a shaft, a set of agitators fixed on said shaft, another set of agitators alternating with said first-named agitators and arranged to turn on said shaft, means for rigidly connecting said last-named set of agitators together, and means for oscillating said sets of agitators in reverse directions, substantially as described.

3. The combination, with a frame, of a vessel for receiving the material to be operated upon, a shaft, a set of agitators fixed on said shaft, another set of agitators alternating with said first-named agitators and arranged to turn on said shaft, a sleeve journaled on said shaft, means for rigidly connecting said last-named set of agitators together and to said sleeve, and means for oscillating said sleeve and the shaft in reverse directions, substantially as described.

4. In a mixing or other similar machine, the combination of an axial support, and a bent finger carried by said support and disposed in a plane substantially at right angles to said support, substantially as described.

5. In a mixing or other similar machine, the combination of an axial support, and a pair of fingers carried by said support, each finger being bent toward the other and disposed in a plane substantially at right angles to said support, substantially as described.

6. The combination of a vessel for receiving the material to be operated upon, sets of agitators arranged in said vessel, means for actuating each set of agitators independently of the other, said agitators being disconnective from their actuating means, and means for locking one of the sets of agitators against movement, substantially as described.

7. The combination of a vessel for receiving the material to be operated upon, a set of agitators adapted to oscillate, said vessel having an inside contour corresponding with the direction of movement of said agitators, and a spring-pressed scraper carried by said agitators and engaging the curved inner surface of said vessel, substantially as described.

8. In a mixing or other similar machine adapted to maintain in operation a constant circulation in the material being operated upon in a given direction, two oscillatory sets of agitators arranged in different planes and having their adjacent portions formed as knife-edges and their rear faces correspondingly oblique and parallel those of one set to those of the other, substantially as described.

9. In a mixing or other similar machine adapted to maintain in operation a constant circulation in the material being operated upon in a given direction, the combination of the vessel in which the mixing is adapted to be effected, an oscillatory set of agitators having their acting faces formed as knife-edges and their rear faces obtusely oblique, and scrapers formed and arranged correspondingly to said agitators and wiping against the end walls of said vessel, substantially as described.

10. In a mixing or other similar machine, the combination, with a frame, of a vessel for receiving the material to be acted upon pivotally suspended in said frame with its axis of movement substantially horizontal, sets of agitators adapted to oscillate in reverse directions about a common axis and arranged in said vessel, the axis of movement of said agitators being also substantially horizontal and said agitators being disposed radially thereto, and means for actuating the agitators, substantially as described.

In testimony that I claim the foregoing I have hereunto set my hand this 14th day of February, 1903.

ERNST F. W. WIEDA.

Witnesses:
 JAMES B. NEWTON,
 ROBERT J. POLLITT.